United States Patent
Mähling et al.

(10) Patent No.: US 6,562,915 B2
(45) Date of Patent: May 13, 2003

(54) METHOD FOR CARRYING OUT RADICAL ETHYLENE HIGH-PRESSURE POLYMERIZATION WHILE PREVENTING UNDESIRED POLYMER DEPOSITS

(75) Inventors: Frank-Olaf Mähling, Mannheim (DE); Andreas Deckers, Flomborn (DE); Dieter Littmann, Mücke (DE); Heinz Friedrich Sutoris, Worms (DE); Kaspar Evertz, Schifferstadt (DE)

(73) Assignees: Basell Polyolefine GmbH, Wesseling (DE); BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/182,563
(22) PCT Filed: Feb. 8, 2001
(86) PCT No.: PCT/EP01/01343
§ 371 (c)(1),
(2), (4) Date: Jul. 31, 2002
(87) PCT Pub. No.: WO01/60875
PCT Pub. Date: Aug. 23, 2001

(65) Prior Publication Data
US 2003/0008982 A1 Jan. 9, 2003

(30) Foreign Application Priority Data
Feb. 16, 2000 (DE) .......................... 100 06 900

(51) Int. Cl.[7] .................................. C08F 2/40
(52) U.S. Cl. .................. 526/82; 526/83; 526/84; 526/226; 526/348; 526/352; 422/131
(58) Field of Search .................. 526/82, 83, 84, 526/226, 348, 352; 422/131

(56) References Cited

U.S. PATENT DOCUMENTS

| 5,059,662 | A | 10/1991 | Wikelski |
| 5,739,242 | A | 4/1998 | Deckers |
| 5,872,252 | A | 2/1999 | Sutoris |
| 5,914,379 | A | 6/1999 | Sutoris |
| 6,180,729 | B1 | 1/2001 | Lange |

FOREIGN PATENT DOCUMENTS

| DE | 196 22441 | 12/1997 |
| DE | 198 18216 | 10/1999 |
| EP | 717 054 | 6/1996 |
| EP | 927 724 | 7/1999 |

OTHER PUBLICATIONS

Foerst, W (Wilheim et al., Ullmanns Encyklopaedie der technischen Chemie, Band 19, Polyacryl–Verbindungen bis Queksilber, p. 169–178, (1951–1969).*

Ullmanns Encyklopaedie der technischen Chemie, Band 19 Polyacryl–Verbindugen bis Quecksilber, Foerst, W (Wilheim) et al. (1951–69). p169–178.

* cited by examiner

Primary Examiner—David W. Wu
Assistant Examiner—William Cheung
(74) Attorney, Agent, or Firm—Keil & Weinkauf

(57) ABSTRACT

In a process for the polymerization or copolymerization of ethylenically unsaturated monomers in the presence of polymerization initiators which decompose to form free radicals in a continuously operated polymerization apparatus comprising a fresh gas feed line, a precompressor, a postcompressor, a reactor, a pressure maintenance valve, a high-pressure circuit having a high-pressure product separator and a high-pressure circulation gas return line, a product valve and a low-pressure circuit having a low-pressure product separator and a low-pressure circulation gas return line, nitrogen monoxide or oxygen is introduced as inhibitor into the high-pressure circuit, into the low-pressure circuit and/or the precompressor.

8 Claims, 1 Drawing Sheet

METHOD FOR CARRYING OUT RADICAL ETHYLENE HIGH-PRESSURE POLYMERIZATION WHILE PREVENTING UNDESIRED POLYMER DEPOSITS

The present invention relates to a process for the polymerization of ethylenically unsaturated monomers with introduction of inhibitors and to the use of the inhibitors.

Polymerization processes in which ethylene polymers are produced by homopolymerization of ethylene or copolymerization of ethylene and compounds which are copolymerizable with ethylene at from 150 to 350° C. and pressures of from 1500 to 3500 bar in continuously operated polymerization reactors in the presence of polymerization initiators which decompose to form free radicals are known. A description of this process and a corresponding process flow diagram may be found in Ullmanns Encyclopädie der technischen Chemie, Verlag Chemie GmbH, Weinheim, Volume 19 (1980), pages 169–178.

In this process, fresh monomer gas is usually compressed in a 5- or 6-stage precompressor from about atmospheric pressure to about 200–300 bar, and the compressed gas is cooled in an intermediate cooler after each stage to remove the heat of compression. In a postcompressor, the gas is compressed to a final pressure of from about 1500 to 3500 bar. In the reactor, namely a tube reactor or autoclave, the polymerization is started by means of initiators. In the tube reactor process, oxygen is frequently used as initiator. Use is also made of initiators which decompose to form free radicals, e.g. peroxides, and oxygen can be combined with peroxides. The monomer gas in which the initiator is already present is heated in a preheater at the reactor inlet to the temperature necessary for commencement of polymerization, for example from 170 to 190° C. In the autoclave reactor, the polymerization is started by introducing initiator solution into the preheated reactor. The monomer conversion in the reactor is usually not more than 20%. After leaving the reactor, the reaction mixture is depressurized by means of a pressure maintenance valve to 200–300 bar into a high-pressure product separator and from there decompressed by means of a product valve to from 1 to 3 bar into a low-pressure product separator. Part of the unreacted monomer gas is separated off by the high-pressure product separator and is returned to the suction side of the postcompressor. The proportion of monomer still present in the polymer is largely removed by outgassing in the low-pressure product separator. The monomer gas substreams which are contaminated by byproducts of the polymerization are recirculated in the high-pressure and low-pressure circuits via coolers and separators, with wax-like and liquid substances being separated off and the recirculated monomer gas at the same time being cooled to a temperature suitable for recompression.

Premature polymerization frequently occurs in the precompressors and compressors in the compression of the ethylenically unsaturated monomer, even prior to initiation of the polymerization, and this leads to deposit formation and makes it necessary for the compressors to be cleaned frequently at short intervals. Owing to the deposit formation and the associated temperature increase in the region of the compressors, the performance of the compressors drops. However, very constant operating conditions are necessary for constantly high product quality. In the region of the high-pressure product separator, the formation of free radicals leads to grafting onto the polymers formed as a result of undesirable chain branching and crosslinking reactions and thus to a reduction in the product quality.

To avoid undesirable polymerization reactions, inhibitors (stabilizers) can be added to the monomer gas mixture. DE-A 196 22 441 describes a process for compressing ethylenically unsaturated monomers to a pressure of from 200 to 5000 bar in the absence of a polymerization initiator, in which compression is carried out in the presence of a sterically hindered amine derivative, for example derivatives of tetramethylpiperidine oxide, as inhibitor. The inhibitors are introduced as solutions, for example in isododecane. The inhibitor is, for example, introduced downstream of the precompressor at 220 bar.

It is an object of the present invention to provide a gaseous inhibitor which can be metered in simply.

We have found that this object is achieved by a process for the polymerization or copolymerization of ethylenically unsaturated monomers in the presence of polymerization initiators which decompose to form free radicals in a continuously operated polymerization apparatus comprising a fresh gas feed line (a), a precompressor (b), a postcompressor (c), a reactor (e), a pressure maintenance valve (f), a high-pressure circuit (g) having a high-pressure product separator (i) and a high-pressure circulation gas return line (l), a product valve (m) and a low-pressure circuit (n) having a low-pressure product separator (o) and a low-pressure circulation gas return line (q), wherein nitrogen monoxide or oxygen is introduced as inhibitor into the high-pressure circuit (g), into the low-pressure circuit (n) and/or the precompressor (b).

BRIEF DESCRIPTION OF THE DRAWINGS

A simplified flow diagram of the polymerization apparatus which is preferably used is shown in FIG. 1. This corresponds, except for the introduction of inhibitor, to the prior art described at the outset. The figure also shows possible points, designated by (r), for introduction of the inhibitor.

The reactor (e) can be any customary high-pressure polymerization reactor, for example a tube reactor or an autoclave. Preference is given to using a tube reactor. All possible types of tubular polymerization reactors can be employed. The reactor (e) can, for example, be a single-zone reactor in which all the monomer gas including initiators, molar mass regulators and, if desired, comonomers is introduced at the reactor inlet. The tube reactor is preferably a multizone reactor with further introduction of cold gas and initiator. The polymerization apparatus can comprise further equipment items. For example, it may have an aftercooler (h) between the pressure maintenance valve (f) and the high-pressure product separator (i). If the reactor (e) is configured as a tube reactor, then the apparatus has a preheater (d) in front of the reactor inlet. If the tube reactor is a multizone reactor, further points for introduction of monomer gas and/or for introduction of further initiators are provided on the reactor. Further customary equipment items may be present. Thus, the high-pressure circuit can include a high-pressure separator (k) and the low-pressure circuit can contain a low-pressure separator (p) for separating off wax-like or liquid byproducts from the circulating gases. The compressors can have intermediate pressure bottles and intermediate coolers between the individual compressor stages. Of course, more than one of each of the equipment items may be present.

Figure 1:
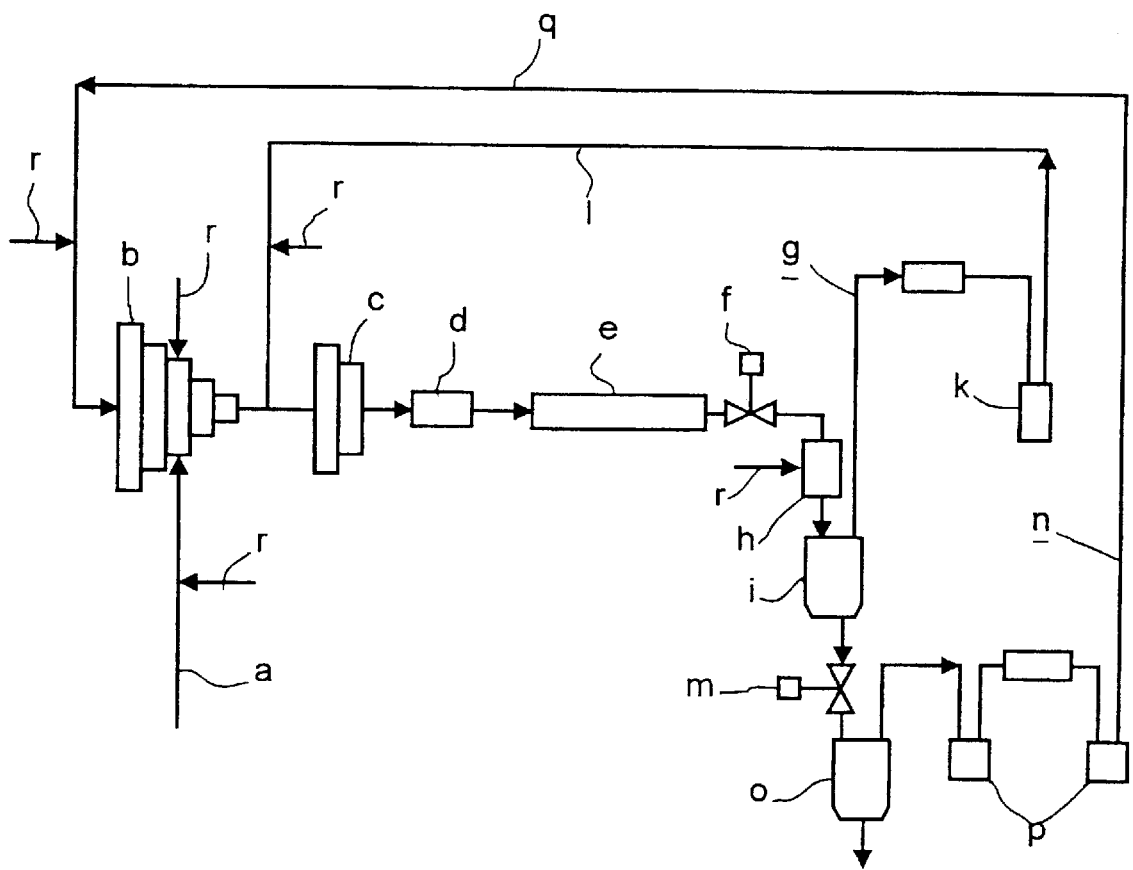

The inhibitor can be introduced at any point into the high-pressure circuit (g), into the low-pressure circuit (n) and/or the precompressor (b). Introduction into the high-pressure circuit, for example into the aftercooler, requires the application of high pressure, for example from 200 to 300 bar, and can be carried out using a compressor. Owing to the associated high equipment cost, introduction into the high-pressure circuit is less preferred.

In a preferred embodiment of the process of the present invention, the inhibitor is introduced into the low-pressure circuit. Here, it is introduced at a low pressure of preferably from 1 to 3 bar, particularly preferably about 1.5 bar. It can be introduced at any point on the low-pressure circuit, for example in the region of the low-pressure circulation gas return line. The inhibitor can also be introduced with the fresh gas. The simple equipment required for introduction is advantageous. Owing to the low pressure, the inhibitor can, for example, be introduced directly from a gas bottle via a reduction valve.

In a further preferred embodiment of the process of the present invention, the inhibitor is introduced into the precompressor. This can be carried out at any stage of the precompressor, but preferably at a pressure of <20 bar, for example on the suction side of the third stage of a six-stage precompressor at about 17 bar. Owing to the low pressure which prevails, introduction can be carried out using simple equipment, for example from a higher pressure via a reduction valve.

It has been found that even small inhibitor concentrations are sufficient to prevent deposit formation caused by undesirable polymerization and/or prevent impairment of the product quality as a result of grafting and gel formation. Thus, it is generally sufficient to introduce the inhibitor in such amounts that an inhibitor concentration of not more than 25 ppm, preferably not more than 10 ppm, particularly preferably from 1 to 10 ppm, is established after it has been introduced. Oxygen as inhibitor is preferably used in concentrations at which it has only an inhibiting action and itself alone does not have a sufficiently initiating action even at relatively high temperatures as occur in the region of the preheater. Oxygen concentrations of from 1 to 5 ppm can be sufficient; the oxygen concentration is preferably 2–5 ppm.

Oxygen generally has an inhibiting action at temperatures below 170° C. and has an initiating action only above 170° C. at an appropriately high concentration, for example from 20 to 100 ppm. Depending on the place where it is introduced, it tends to act as a free radical trap and thus has an inhibiting action in the compressors and preheaters.

Nitrogen monoxide has an inhibiting effect on the polymerization of ethylene up to high temperatures of about 300° C. Depending on the point at which it is introduced, it has an inhibiting action in the compressor, preheater, reactor, aftercooler and high-pressure circuit.

The polymerization reaction is initiated by means of an initiator which decomposes to form free radicals, for example a peroxide or a peroxide mixture. In the presence of oxygen as inhibitor, the initiation occurs essentially exclusively by means of the decomposition of peroxide. Suitable peroxide initiators are, for example, diisopropylbenzene hydroperoxide, di-tert-butyl peroxide, cumene hydroperoxide, tert-butyl peroxyisononate, methyl isobutyl ketone peroxide, preferably t-butyl peroxypivalate, t-butyl peroxyisononate and methyl isobutyl ketone peroxide.

The polymerization temperature is preferably in the range from 150° C. to 350° C., and preferred pressures are in the range from 1500 to 3500 bar. The preferred ethylenically unsaturated monomer is ethylene. This can be either homopolymerized or copolymerized, for example with acrylic acid. Particular preference is given to homopolymerizing ethylene to give LD polyethylene. All customary additives, for example molecular weight regulators, can be present in the polymerization mixture.

The process of the present invention enables the formation of deposits, which is attributable to undesirable, premature polymerization in the region of the precompressors, to be greatly reduced. This has a positive effect on the product quality. In the region of the aftercooler and product separator, grafting onto the polymers can be countered. This results in a reduced level of gel particles and thus higher product quality.

The invention is illustrated by the following examples.

EXAMPLE 1

Deposit Formation

In a plant for the high-pressure polymerization of ethylene, oxygen or nitrogen monoxide as inhibitor was introduced on the suction side of the 3rd stage of the precompressor, so that an inhibitor concentration of 3 ppm or 2 ppm was established. After 2, 4, 8 and 12 weeks, the intermediate coolers and intermediate pressure bottles on the postcompressor were opened. Even after 12 weeks, no appreciable deposits were found.

For comparison, the plant was operated without addition of an inhibitor. After 2 weeks, the thickness of the deposits in the intermediate pressure bottle was about 0.5 mm, after 12 weeks about 5 mm.

EXAMPLE 2

Product Quality

The inhibitor concentrations indicated in Tables 1 and 2 were employed, with introduction being carried out as described under Example 1. A polyethylene having the indicated product specifications was obtained.

TABLE 1

| | | | NO inhibition | | | |
|---|---|---|---|---|---|---|
| Inhibitor concentration [ppm] | Amount introduced [l/h] | Peroxide consumption [g/t of PE] | Melt flow index 2.16/190 [g/10 min] | Density [kg/m$^3$] | Extensibility [μm] | Scattering [%] |
| 0 | 0 | 312 | 0.83 | 923.7 | 23 | 21 |
| 2 | 15.5 | 326 | 0.89 | 923.6 | 20 | 18 |
| 5 | 38.1 | 315 | 0.88 | 923.6 | 17 | 17 |
| 11 | 85.9 | 340 | 0.90 | 923.8 | 18 | 18 |

TABLE 2

| | | | O$_2$ inhibition | | | |
|---|---|---|---|---|---|---|
| Inhibitor concentration [ppm] | Amount introduced [l/h] air | Peroxide consumption [g/t PE] | Melt flow index 2.16/190 [g/10 min] | Density [kg/m$^3$] | Extensibility [μm] | Scattering [%] |
| 0 | 0 | 312 | 0.83 | 923.7 | 23 | 21 |
| 3 | 102 | 304 | 0.85 | 923.3 | 19 | 18 |
| 6 | 199 | 296 | 0.89 | 923.5 | 20 | 17 |

Products of consistently good quality are obtained by means of the inhibitors used according to the present invention. The products display, in particular, a good extensibility and low scattering.

We claim:

1. A process for the polymerization or copolymerization of ethylenically unsaturated monomers in the presence of polymerization initiators which decompose to form free radicals in a continuously operated polymerization apparatus comprising a fresh gas feed line (a), a precompressor (b), a postcompressor (c), a reactor (e), a pressure maintenance valve (f), a high-pressure circuit (g) having a high-pressure product separator (i) and a high-pressure circulation gas return line (l), a product valve (m) and a low-pressure circuit (n) having a low-pressure product separator (o) and a low-pressure circulation gas return line (q), wherein nitrogen monoxide or oxygen is introduced as inhibitor into the high-pressure circuit (g), into the low-pressure circuit (n) and/or the precompressor (b).

2. A process as claimed in claim 1, wherein an inhibitor concentration of not more than 25 ppm is established after introduction of the inhibitor.

3. A process as claimed in claim 1, wherein nitrogen monoxide is introduced as inhibitor.

4. A process as claimed in claim 1, wherein oxygen is introduced as inhibitor and an inhibitor concentration of from 1 to 10 ppm is established after the introduction.

5. A process as claimed in claim 4, wherein an inhibitor concentration of from 2 to 5 ppm is established.

6. A process as claimed in claim 1, wherein the inhibitor is introduced into the precompressor.

7. A process as claimed in claim 6, wherein the inhibitor is introduced at a pressure of <20 bar.

8. A process as claimed in claim 1 in which ethylene is polymerized.

* * * * *